(12) United States Patent
Zhu

(10) Patent No.: US 11,533,728 B2
(45) Date of Patent: Dec. 20, 2022

(54) DATA TRANSMISSION METHOD AND APPARATUS ON UNLICENSED FREQUENCY BAND

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 90 days.

(21) Appl. No.: 17/251,381

(22) PCT Filed: Jun. 15, 2018

(86) PCT No.: PCT/CN2018/091664
§ 371 (c)(1),
(2) Date: Dec. 11, 2020

(87) PCT Pub. No.: WO2019/237361
PCT Pub. Date: Dec. 19, 2019

(65) Prior Publication Data
US 2021/0258945 A1     Aug. 19, 2021

(51) Int. Cl.
*H04W 72/04* (2009.01)
*H04W 52/02* (2009.01)
*H04W 64/00* (2009.01)

(52) U.S. Cl.
CPC ..... *H04W 72/048* (2013.01); *H04W 52/0229* (2013.01); *H04W 64/006* (2013.01); *H04W 72/042* (2013.01)

(58) Field of Classification Search
CPC ........... H04W 72/048; H04W 52/0229; H04W 64/006; H04W 72/042; H04W 16/14;
(Continued)

(56) References Cited

U.S. PATENT DOCUMENTS

2016/0095048 A1\* 3/2016 Nory .................... H04J 11/0093
370/252
2016/0142987 A1    5/2016 Blankenship et al.
2017/0048721 A1\* 2/2017 Sun ........................ H04W 16/16
(Continued)

FOREIGN PATENT DOCUMENTS

CN        104602267 A     5/2015
CN        105634703 A     6/2016
(Continued)

OTHER PUBLICATIONS

International Search Report dated Feb. 27, 2019 in PCT/CN2018/091664 (submitting English translation only), 2 pages.
(Continued)

*Primary Examiner* — Kiet Tang
(74) *Attorney, Agent, or Firm* — Oblon, McClelland, Maier & Neustadt, L.L.P.

(57) ABSTRACT

The present disclosure provides a data transmission method and apparatus. The method is applied to a terminal, and the method comprises: determining a non-fixed position for signalling detection on an unlicensed frequency band; detecting control signalling detection at the non-fixed position; and when control signalling is detected, carrying out corresponding data transmission according to an indication of the control signalling. Therefore, in the present disclosure, the detection of control signalling on an unlicensed frequency band can be achieved by means of a terminal, the control signaling can also be accurately detected, and the success rate of corresponding data transmission can also be ensured.

12 Claims, 9 Drawing Sheets

(58) Field of Classification Search
CPC ........... H04W 74/0808; H04W 74/006; H04W 4/20; H04W 16/16; Y02D 30/70; H04L 5/0044; H04L 5/0094; H04L 27/0006; H04L 5/0053; H04J 11/0093; H04N 5/765

See application file for complete search history.

(56) References Cited

U.S. PATENT DOCUMENTS

| | | | |
|---|---|---|---|
| 2017/0289817 | A1 | 10/2017 | Shekalim et al. |
| 2020/0344444 | A1* | 10/2020 | Ma .................. H04N 5/765 |

FOREIGN PATENT DOCUMENTS

| CN | 105722225 A | 6/2016 |
|---|---|---|
| CN | 107294686 A | 10/2017 |
| CN | 105634703 B | 11/2017 |
| CN | 107637006 A | 1/2018 |
| CN | 108886461 A | 11/2018 |

OTHER PUBLICATIONS

Written Opinion of the International Searching Authority dated Feb. 27, 2019 in PCT/CN2018/091664 (submitting English translation only), 4 pages.

Combined Chinese Office Action and Search Report dated Jul. 29, 2020 in Chinese Patent Application No. 201880000962.3 (with English translation), 18 pages.

"Enhanced Spectrum Access Use Cases for 5G systems: the Vision of the European funded Projects ADEL and SPEED-5G" Intel, Altice Labs, 3GPP TSG-SA WG1 Meeting #74, S1-161174, May 13, 2016, entire document, 28 pages.

* cited by examiner

DATA TRANSMISSION METHOD AND APPARATUS ON UNLICENSED FREQUENCY BAND

RELATED APPLICATION

This application claims the benefit of International Application No. PCT/CN2018/091664, entitled "DATA TRANSMISSION METHOD AND APPARATUS" and filed on Jun. 15, 2018, which is incorporated herein by reference in its entirety.

TECHNICAL FIELD

The present disclosure generally relates to the technical field of communication, including to a data transmission method and device.

BACKGROUND

In a new-generation communication system, flexible configuration of multiple service types is required to be supported. Moreover, different service types correspond to different service requirements. For example, requirements of an enhanced Mobile Broad Band (eMBB) service type mainly focus on large bandwidth, high rate and other aspects. Requirements of an Ultra Reliable Low Latency Communication (URLLC) service type mainly focus on the aspects of relatively high reliability and low latency. Requirements of a massive Machine Type Communication (mMTC) service type mainly focus on the aspect of large connection number. However, along with the development of service requirements, only using licensed spectrums are unable to meet more service requirements in the new-generation communication system.

SUMMARY

Exemplary embodiments of the present disclosure provide a data transmission method and device.

According to a first aspect of the present disclosure, a data transmission method is provided, which may be applied to a terminal and can include that a non-fixed position for signaling detection on an unlicensed frequency band is determined, and control signaling detection is performed at the non-fixed position. Further, the method can include that, in condition that control signaling is detected, data transmission corresponding to the control signaling is performed according to an indication of the control signaling.

In an embodiment of the disclosure, the operation that the non-fixed position for signaling detection on the unlicensed frequency band is determined may include that the non-fixed position is determined based on an obtained data transmission starting position.

In another embodiment of the disclosure, the operation that the non-fixed position is determined based on the obtained data transmission starting position may include that configuration information used for determining the data transmission starting position is acquired, and at least one data transmission starting position is determined according to the configuration information. Further, the operation can include that a non-fixed position corresponding to each data transmission starting position is determined according to a first set rule.

In a further embodiment of the disclosure, the configuration information may be specified in a communication protocol or notified to the terminal by a base station through specified signaling.

In an embodiment of the disclosure, the first set rule may include a first correspondence between a specified data transmission starting position and at least one specified detection position. The operation that the detection position corresponding to each data transmission starting position and configured for signaling detection is determined according to the first set rule may further include that, for any data transmission starting position, each specified detection position corresponding to the data transmission starting position is determined according to the first correspondence, and each specified detection position corresponding to the data transmission starting position is determined as a non-fixed position.

In an embodiment of the disclosure, the first set rule may be specified in a communication protocol or notified to the terminal by a base station through specified signaling, and the first set rule may also include a second correspondence between a specified data transmission starting position and a specified detection manner. The method may further include that, for any data transmission starting position, a specified detection manner corresponding to the data transmission starting position is determined according to the second correspondence. The operation that control signaling detection is performed at the detection position may include that, for any data transmission starting position, control signaling detection is performed at the specified detection position corresponding to the data transmission starting position in the specified detection manner corresponding to the data transmission starting position.

In another embodiment of the disclosure, the operation that the non-fixed position for signaling detection on the unlicensed frequency band is determined may include that the non-fixed position is determined based on a detected known signal.

In an embodiment of the disclosure, the operation that the non-fixed position is determined based on the detected known signal may include that the known signal sent by the base station is continuously detected, and, in condition that the known signal is detected, a non-fixed position corresponding to the known signal is determined according to a second set rule.

In a further embodiment of the disclosure, the second set rule may include a third correspondence between a specified signal sequence and at least one specified detection position. The operation that the non-fixed position corresponding to the known signal is determined according to the third set rule may include that a signal sequence of the known signal is acquired, and each specified detection position corresponding to the signal sequence of the known signal is determined according to the first correspondence, and each specified detection position corresponding to the signal sequence of the known signal is determined as a non-fixed position.

In an embodiment of the disclosure, the second set rule may be specified in a communication protocol or notified to the terminal by the base station through specified signaling, and the second set rule may also include a fourth correspondence between a specified signal sequence and a specified detection manner. The method may further include that a specified detection manner corresponding to the signal sequence of the known signal is determined according to the fourth correspondence. The operation that control signaling detection is performed at the detection position may further include that control signaling detection is performed at each specified detection position corresponding to the signal sequence of the known signal in the specified detection manner corresponding to the signal sequence of the known signal.

In an embodiment of the disclosure, the operation that the non-fixed position for signaling detection on the unlicensed frequency band is determined may include that the non-fixed position is determined based on triggering signaling sent by the base station.

In other embodiments of the disclosure, the operation that the non-fixed position is determined based on the triggering signaling sent by the base station may include that the triggering signaling sent by the base station and configured to trigger signaling detection is received, and a non-fixed position corresponding to the triggering signaling is determined according to a third set rule.

In an embodiment of the disclosure, the triggering signaling may be a wakeup signal sent by the base station, the third set rule may include a fifth correspondence between a specified signal sequence and at least one specified detection position. The operation that the non-fixed position corresponding to the triggering signaling is determined according to the third set rule may include that a signal sequence of the wakeup signal is acquired, and each specified detection manner corresponding to the signal sequence of the wakeup signal is determined according to the fifth correspondence, and each specified detection position corresponding to the signal sequence of the wakeup signal is determined as a non-fixed position.

In a further embodiment of the disclosure, the third set rule may be specified in a communication protocol or notified to the terminal by the base station through the specified signaling, and the third set rule may also include a sixth correspondence between a specified signal sequence and a specified detection manner. The method may further include that a specified detection manner corresponding to the signal sequence of the wakeup signal is determined according to the sixth correspondence. The operation that control signaling detection is performed at the detection position may include that control signaling detection is performed at each specified detection position corresponding to the signal sequence of the wakeup signal in the specified detection manner corresponding to the signal sequence of the wakeup signal.

In an embodiment of the disclosure, the specified signaling may include at least one of Radio Resource Control (RRC) signaling, Media Access Control-Control Element (MAC-CE) signaling, or physical-layer signaling.

According to a second aspect of the embodiments of the present disclosure, a data sending device is provided, which may be applied to a terminal and include a position determination module that is configured to determine a non-fixed position for signaling detection on an unlicensed frequency band, a signaling detection module that is configured to perform control signaling detection at the non-fixed position, and a data transmission module that is configured to, in condition that control signaling is detected, perform data transmission corresponding to the control signaling according to an indication of the control signaling.

In an embodiment of the disclosure, the position determination module may include a first position determination submodule that is configured to determine the non-fixed position based on an obtained data transmission starting position.

In an embodiment of the disclosure, the first position determination submodule may further include a first acquisition submodule that is configured to acquire configuration information used for determining the data transmission starting position, a first determination submodule that is configured to determine at least one data transmission starting position according to the configuration information, and a second determination submodule that is configured to determine a non-fixed position corresponding to each data transmission starting position according to a first set rule.

In an embodiment of the disclosure, the configuration information may be specified in a communication protocol or notified to the terminal by a base station through specified signaling.

In an embodiment of the disclosure, the first set rule may include a first correspondence between a specified data transmission starting position and at least one specified detection position. The second determination submodule may include a third determination submodule that is configured to, for any data transmission starting position, determine each specified detection position corresponding to the data transmission starting position according to the first correspondence and determine each specified detection position corresponding to the data transmission starting position as a non-fixed position.

In an embodiment of the disclosure, the first set rule may be specified in a communication protocol or notified to the terminal by a base station through specified signaling, and the first set rule may also include a second correspondence between a specified data transmission starting position and a specified detection manner. The device may further include a first determination module that is configured to, for any data transmission starting position, determine a specified detection manner corresponding to the data transmission starting position according to the second correspondence. The signaling detection module may include a first signaling detection submodule that is configured to, for any data transmission starting position, perform control signaling detection at the specified detection position corresponding to the data transmission starting position in the specified detection manner corresponding to the data transmission starting position.

In an embodiment of the disclosure, the position determination module may include a second position determination submodule, configured to determine the non-fixed position based on a detected known signal.

In an embodiment of the disclosure, the second position determination submodule may include a detection submodule that is configured to continuously detect the known signal sent by the base station, and a fourth determination submodule that is configured to, in condition that the known signal is detected, determine a non-fixed position corresponding to the known signal according to a second set rule.

In another embodiment of the disclosure, the second set rule may include a third correspondence between a specified signal sequence and at least one specified detection position. The fourth determination submodule may include a second acquisition submodule that is configured to acquire a signal sequence of the known signal, and a fifth determination submodule that is configured to determine each specified detection position corresponding to the signal sequence of the known signal according to the first correspondence and determine each specified detection position corresponding to the signal sequence of the known signal as a non-fixed position.

In an embodiment of the disclosure, the second set rule may be specified in a communication protocol or notified to the terminal by the base station through specified signaling, and the second set rule may also include a fourth correspondence between a specified signal sequence and a specified detection manner. The device may further include a second determination module that is configured to determine a specified detection manner corresponding to the signal sequence of the known signal according to the fourth correspondence. The signaling detection module may include a second signaling detection submodule that is configured to perform control signaling detection at each specified detection position corresponding to the signal sequence of the known signal in the specified detection manner corresponding to the signal sequence of the known signal.

In an embodiment of the disclosure, the position determination module may include a third position determination submodule that is configured to determine the non-fixed position based on triggering signaling sent by the base station.

In other embodiments of the disclosure, the third position determination submodule may include a receiving submodule that is configured to receive the triggering signaling sent by the base station and configured to trigger signaling detection, and a sixth determination submodule that is configured to determine a non-fixed position corresponding to the triggering signaling according to a third set rule.

In an embodiment of the disclosure, the triggering signaling may be a wakeup signal sent by the base station, and the third set rule may include a fifth correspondence between a specified signal sequence and at least one specified detection position. The sixth determination submodule may include a third acquisition submodule that is configured to acquire a signal sequence of the wakeup signal, and a seventh determination submodule that is configured to determine each specified detection position corresponding to the signal sequence of the wakeup signal according to the fifth correspondence and determine each specified detection position corresponding to the signal sequence of the wakeup signal as a non-fixed position.

In a further embodiment of the disclosure, the third set rule may be specified in a communication protocol or notified to the terminal by the base station through the specified signaling, and the third set rule may also include a sixth correspondence between a specified signal sequence and a specified detection manner. The device may further include a third determination module that is configured to determine a specified detection manner corresponding to the signal sequence of the wakeup signal according to the sixth correspondence. The signaling detection module may include a third signaling detection submodule, configured to perform control signaling detection at each specified detection position corresponding to the signal sequence of the wakeup signal in the specified detection manner corresponding to the signal sequence of the wakeup signal.

In an embodiment of the disclosure, the specified signaling may include at least one of a RRC signaling, MAC-CE signaling, or physical-layer signaling.

According to a third aspect of the present disclosure, a non-transitory computer-readable storage medium is provided, in which a computer program may be stored. The computer program may be configured to execute the data sending method provided in the first aspect.

According to a fourth aspect of the present disclosure, a data sending device is provided, which may be applied to a terminal and include a processor and a memory configured to store an instruction executable by the processor. The processor may be configured to determine a non-fixed position for signaling detection on an unlicensed frequency band, and perform control signaling detection at the non-fixed position. Further, in condition that control signaling is detected, the processor may perform data transmission corresponding to the control signaling according to an indication of the control signaling.

The technical solutions provided in the embodiments of the present disclosure may have beneficial effects. For example, in the embodiments of the present disclosure, the terminal may determine the non-fixed position for signaling detection on the unlicensed frequency band, perform control signaling detection at the non-fixed position for signaling detection and, when the control signaling is detected, perform corresponding data transmission according to the indication of the control signaling. Therefore, control signaling detection on the unlicensed frequency band is implemented, the control signaling is accurately detected, and the success rate of corresponding data transmission is also ensured.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments and not intended to limit the present disclosure. "A/an", "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms first, second, third and the like may be adopted to describe various information in the present disclosure, the information should not be limited to these terms. These terms are only adopted to distinguish the information of the same type. For example, without departing from the scope of the present disclosure, indication information may also be called second information and, similarly, second information may also be called indication information. For example, term "if" used here may be explained as "while" or "when" or "responsive to determining", which depends on the context.

Figure 1:
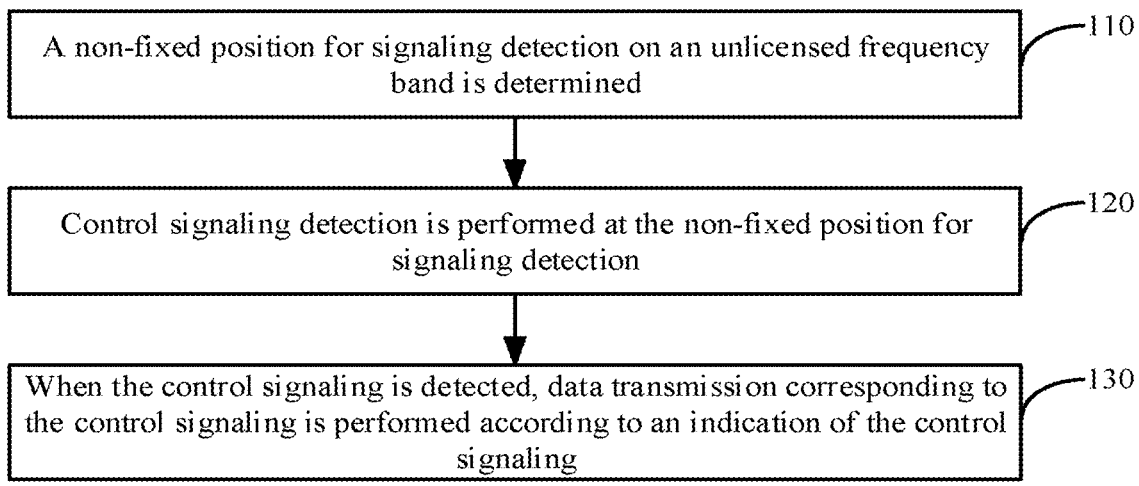
FIG. 1 is a flow chart illustrating a data transmission method according to an exemplary embodiment.
Figure 2:
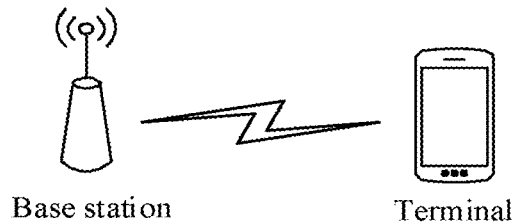
FIG. 2 is a diagram illustrating an application scenario of a data transmission method according to an exemplary embodiment.

FIG. 1 is a flow chart illustrating a data transmission method according to an exemplary embodiment. FIG. 2 is a diagram illustrating an application scenario of a data transmission method according to an exemplary embodiment. The data transmission method may be applied to a terminal. As shown in FIG. 1, the data transmission method includes the following operations 110-130.

In step 110, a non-fixed position for signaling detection on an unlicensed frequency band is determined. In the embodiment of the present disclosure, data transmission is usually scheduled based on control signaling sent by a base station, and the terminal, after receiving the control signaling sent by the base station, may perform data transmission at a corresponding time-frequency position based on an indication of the control signaling.

In the related art, for an existing licensed frequency band, a position where the base station sends the control signaling may be pre-configured for the terminal, and the terminal may perform control signaling detection at the notified or predefined position. However, on an unlicensed frequency band, multiple systems are required to contend for a channel resource, so the method of pre-configuring the control signaling detection position is not applied to the unlicensed frequency band. That is, for an existing unlicensed frequency band, performing control signaling detection at a fixed position may influence the system operation efficiency on the unlicensed frequency band. Therefore, in the data transmission method disclosed in the present disclosure, it is necessary to determine the non-fixed position for signaling detection on the unlicensed frequency band at first, and then control signaling detection is performed at the non-fixed position. In such a manner, the influence on the system operation efficiency on the unlicensed frequency band is avoided.

There are many implementation manners for determining the non-fixed position for signaling detection on the unlicensed frequency band, including, but not limited to, the following three implementation manners. In a first manner, the non-fixed position is determined based on an obtained data transmission starting position. A specific implementation process may refer to the embodiment shown in FIG. 3. In a second manner, the non-fixed position is determined based on a detected known signal. A specific implementation process may refer to the embodiment shown in FIG. 4. In a third manner, the non-fixed position is determined based on triggering signaling sent by a base station. A specific implementation process may refer to the embodiment shown in FIG. 5.

In step 120, control signaling detection is performed at the non-fixed position for signaling detection.

In step 130, when the control signaling is detected, data transmission corresponding to the control signaling is performed according to an indication of the control signaling.

In an exemplary scenario, as shown in FIG. 2, a base station and a terminal are included. The terminal may determine a non-fixed position for signaling detection on an unlicensed frequency band at first, then performs control signaling detection at the unfixed position for signaling detection, and only when control signaling is detected, may perform corresponding data transmission according to an indication of the control signaling. Performing control signaling detection at the non-fixed position in such a manner may accurately detect the control signaling and avoid high power consumption of the terminal.

It can be seen from the embodiment that the non-fixed position for signaling detection on the unlicensed frequency band is determined, control signaling detection is performed at the non-fixed position for signaling detection, and responsive to that the control signaling is detected, corresponding data transmission is performed according to the indication of the control signaling. Therefore, control signaling detection on the unlicensed frequency band is implemented, the control signaling is accurately detected, and the success rate of corresponding data transmission is also ensured.

Figure 3:
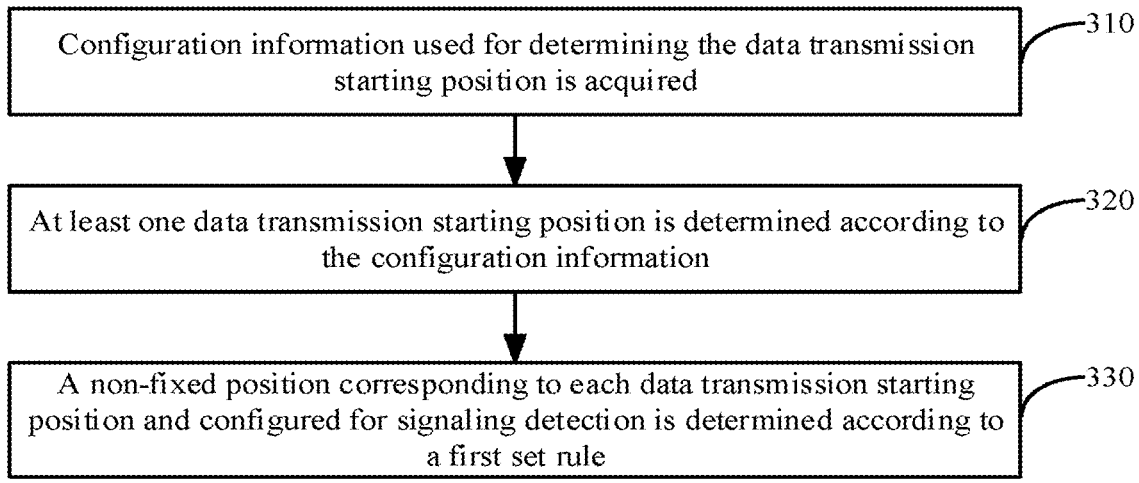
FIG. 3 is a flow chart illustrating another data transmission method according to an exemplary embodiment.

FIG. 3 is a flow chart illustrating another data transmission method according to an exemplary embodiment. The data transmission method may be applied to a terminal. The method is based on the method shown in FIG. 1. When the operation in step 110 is executed, the non-fixed position may be determined based on an obtained data transmission starting position. As shown in FIG. 3, when the non-fixed position is determined based on the obtained data transmission starting position, the following operations in steps 310 to 330 may be included.

In step 310, configuration information used for determining the data transmission starting position is acquired. In the embodiment of the present disclosure, the data transmission starting position that may be determined through the configuration information may refer to a possible starting position of data transmission. In an embodiment, the configuration information configured to determine the data transmission starting position may be specified in a communication protocol or notified to the terminal by the base station through specified signaling. In a further embodiment, the specified signaling configured by the base station to transmit the configuration information may include at least one of: (1-1) RRC signaling; or (1-2) MAC-CE signaling; or (1-3) physical-layer signaling.

In step 320, at least one data transmission starting position is determined according to the configuration information.

Figure 3A:
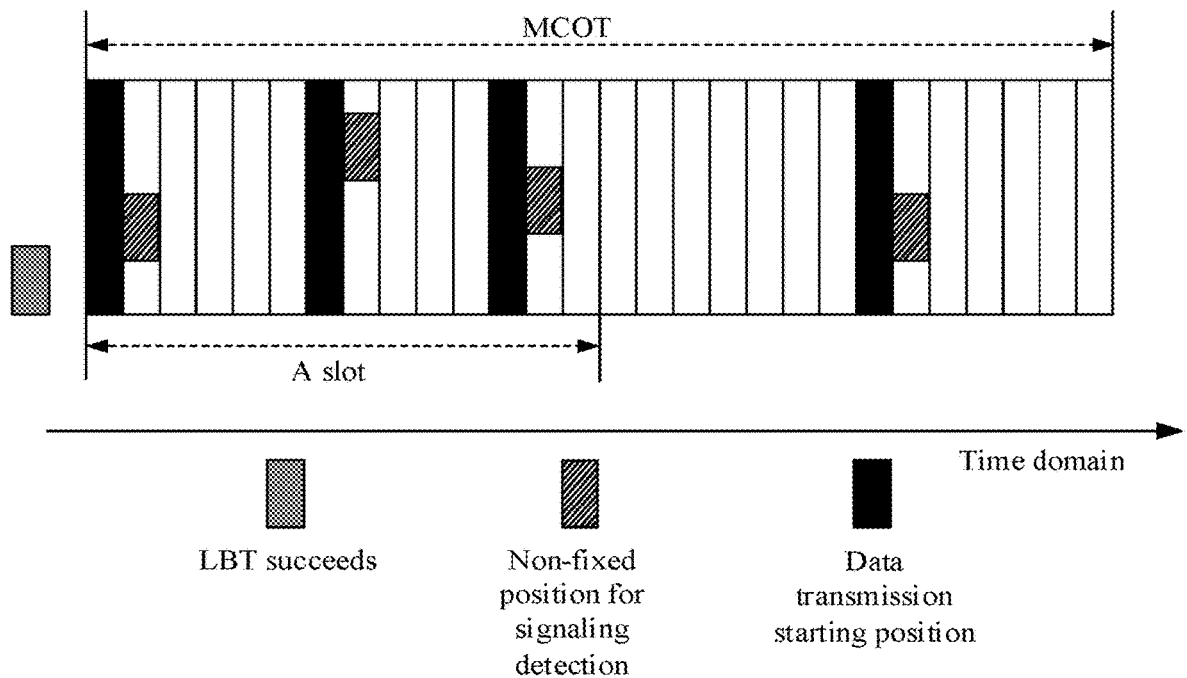
FIG. 3A is a schematic diagram illustrating non-fixed positions for signaling detection according to an exemplary embodiment.
Figure 3B:
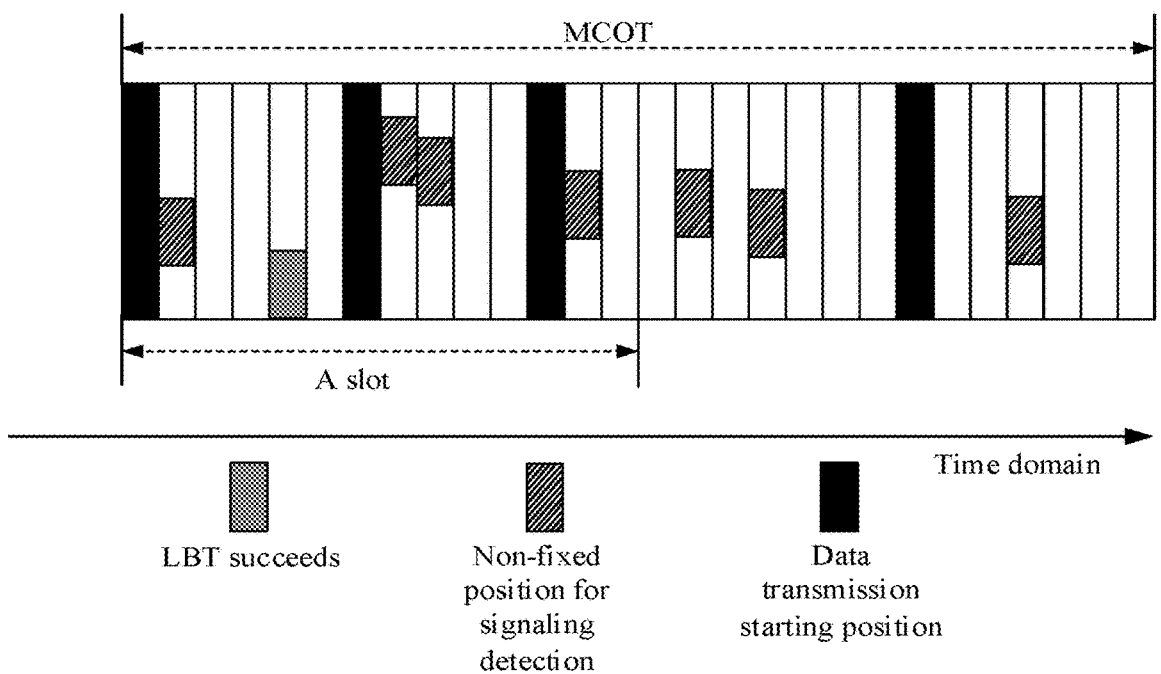
FIG. 3B is another schematic diagram illustrating non-fixed positions for signaling detection according to an exemplary embodiment.

In step 330, a non-fixed position corresponding to each data transmission starting position and configured for signaling detection is determined according to a first set rule. In the embodiment of the present disclosure, the non-fixed position that may be determined according to the first set rule and corresponds to each data transmission starting position may be a specified position after each data transmission starting position. As shown in FIG. 3A, the specified position is a second Orthogonal Frequency Division Multiplexing (OFDM) symbol of the data transmission starting position. In addition, the non-fixed position that may be determined according to the first set rule and corresponds to each data transmission starting position may be the same (as shown in FIG. 3A) and may also be different (as shown in FIG. 3B).

In an embodiment, the first set rule may include a first correspondence between a specified data transmission starting position and at least one specified detection position. When the operation in step 330 is executed, for any data transmission starting position, each specified detection position corresponding to the data transmission starting position may be determined according to the first correspondence, and each specified detection position corresponding to the data transmission starting position may be determined as a non-fixed position.

In another embodiment, the first set rule may also include a second correspondence between a specified data transmission starting position and a specified detection manner, or the second correspondence is in another set rule different from the first set rule. The method further includes that, for any data transmission starting position, a specified detection manner corresponding to the data transmission starting position may be determined according to the second correspondence. Correspondingly, when the operation in step 120 is executed, for any data transmission starting position, control signaling detection may be performed at the specified detection position corresponding to the data transmission starting position in the specified detection manner corresponding to the data transmission starting position.

In an embodiment, the first set rule may be specified in a communication protocol or notified to the terminal by the base station through the specified signaling, and another set rule different from the first set rule may also be specified in the communication protocol or notified to the terminal by the base station through the specified signaling.

In a further embodiment, the specified signaling configured by the base station to transmit the first set rule may include at least one of: (2-1) RRC signaling; or (2-2) MAC-CE signaling; or (1-3) physical-layer signaling. It can be seen from the embodiment that control signaling detection may be performed at the non-fixed position corresponding to each data transmission starting position, thereby enriching determination manners for the non-fixed position and improving flexibility of the control signaling detection.

Figure 4:
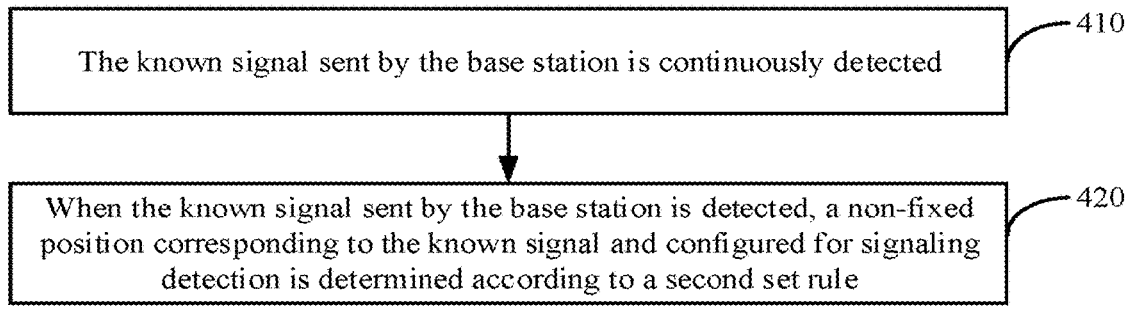
FIG. 4 is a flow chart illustrating another data transmission method according to an exemplary embodiment.

FIG. 4 is a flow chart illustrating another data transmission method according to an exemplary embodiment. The data transmission method may be applied to a terminal. The method is based on the method shown in FIG. 1. When the operation in step 110 is executed, the non-fixed position may be determined based on a detected known signal. As shown in FIG. 4, when the non-fixed position is determined based on the detected known signal, the following operations in steps 410 to 420 may be included.

Figure 4A:
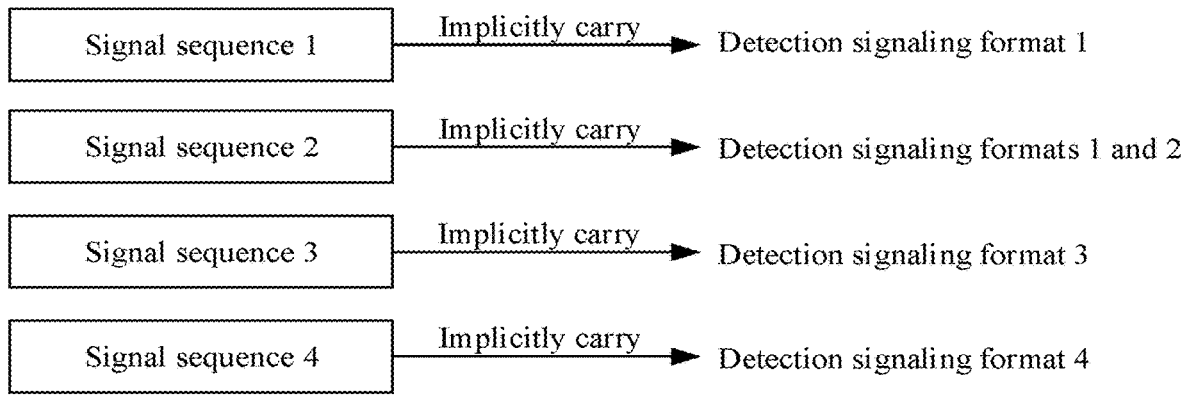
FIG. 4A is a schematic diagram illustrating that different signal sequences may implicitly contain different information according to an exemplary embodiment.

In step 410, the known signal sent by the base station is continuously detected. In the embodiment of the present disclosure, a signal sequence of the known signal may implicitly carry information. The information carried implicitly may be format information of the control signaling, and/or a detection position for the control signaling, and/or a detection manner for the control signaling, and the like. As shown in FIG. 4A, different signal sequences may implicitly carry different information.

In step 420, when the known signal sent by the base station is detected, a non-fixed position corresponding to the known signal and configured for signaling detection is determined according to a second set rule. In the embodiment of the present disclosure, one or more non-fixed positions corresponding to the known signal may be determined according to the second set rule. In addition, when the known signal is not detected, the terminal may continue detecting the known signal sent by the base station.

In an embodiment, the second set rule may include a third correspondence between a specified signal sequence and at least one specified detection position. When the operation in step 420 is executed, the signal sequence of the known signal may be acquired, each specified detection position corresponding to the signal sequence of the known signal may be determined according to the first correspondence, and each specified detection position corresponding to the signal sequence of the known signal may be determined as a non-fixed position.

In an embodiment, the second set rule may also include a fourth correspondence between a specified signal sequence and a specified detection manner, or the fourth correspondence is in another set rule different from the second set rule. The method further includes that: a specified detection manner corresponding to the signal sequence of the known signal is determined according to the fourth correspondence. Correspondingly, when the operation in step 120 is executed, control signaling detection may be performed at each specified detection position corresponding to the signal sequence of the known signal in the specified detection manner corresponding to the signal sequence of the known signal.

In an embodiment, the second set rule may be specified in a communication protocol or notified to the terminal by the base station through the specified signaling, and another set rule different from the second set rule may also be specified in the communication protocol or notified to the terminal by the base station through the specified signaling.

In an embodiment, the specified signaling configured by the base station to transmit the second set rule may include at least one of (3-1) RRC signaling; or (3-2) MAC-CE signaling; or (3-3) physical-layer signaling. It can be seen from the embodiment that, when the known signal is detected, control signaling detection may be performed at the non-fixed position corresponding to the known signal, thereby improving reliability of the control signaling detection and further improving accuracy of the data transmission.

Figure 5:
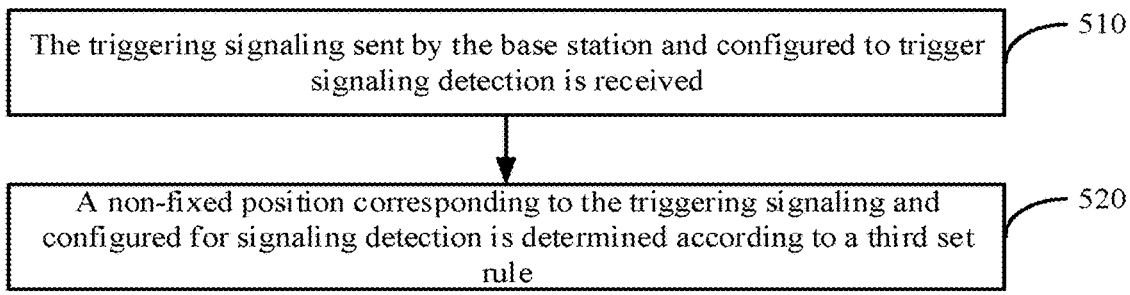
FIG. 5 is a flow chart illustrating another data transmission method according to an exemplary embodiment.

FIG. 5 is a flow chart illustrating another data transmission method according to an exemplary embodiment. The data transmission method may be applied to a terminal. The method is based on the method shown in FIG. 1. When the operation in 110 is executed, the non-fixed position may be determined based on triggering signaling sent by the base station. As shown in FIG. 5, when the non-fixed position is determined based on the triggering signaling sent by the base station, the following operations in steps 510 to 520 may be included.

In step 510, the triggering signaling sent by the base station and configured to trigger signaling detection is received. In the embodiment of the present disclosure, the terminal performs control signaling detection based on the triggering signaling of the base station. For example, the base station, after successfully passing channel detection, may send a wakeup signal to the terminal, and the terminal, after receiving the wakeup signal, may detect control channel at a corresponding non-fixed position.

In step 520, a non-fixed position corresponding to the triggering signaling and configured for signaling detection is determined according to a third set rule. In the embodiment of the present disclosure, one or more non-fixed positions corresponding to the triggering signaling may be determined according to the third set rule.

In an embodiment, the triggering signaling is a wakeup signal sent by the base station. The third set rule may include a fifth correspondence between a specified signal sequence and at least one specified detection position. When the operation in step 520 is executed, a signal sequence of the wakeup signal may be acquired, each specified detection position corresponding to the signal sequence of the wakeup signal may be determined according to the fifth correspondence, and each specified detection position corresponding to the signal sequence of the wakeup signal may be determined as a non-fixed position.

In an embodiment, the third set rule may also include a sixth correspondence between a specified signal sequence and a specified detection manner, or the sixth correspondence is in another set rule different from the third set rule. The method further includes that: a specified detection manner corresponding to the signal sequence of the wakeup signal is determined according to the sixth correspondence. Correspondingly, when the operation in step 120 is executed, control signaling detection may be performed at each specified detection position corresponding to the signal sequence of the wakeup signal in the specified detection manner corresponding to the signal sequence of the wakeup signal.

In an embodiment, the third set rule is specified in a communication protocol or notified to the terminal by the base station through the specified signaling, and another set rule different from the third set rule may also be specified in the communication protocol or notified to the terminal by the base station through the specified signaling.

In an embodiment, the specified signaling configured by the base station to transmit the third set rule may include at least one of: (4-1) RRC signaling; or (4-2) MAC-CE signaling; or (4-3) physical-layer signaling.

It can be seen from the embodiment that, when the triggering signaling sent by the base station and configured to trigger signaling detection is received, control signaling detection may be performed at the non-fixed position corresponding to the triggering signaling, so that control signaling detection is completed under triggering of the base station, and reliability of the data transmission is improved.

Figure 6:
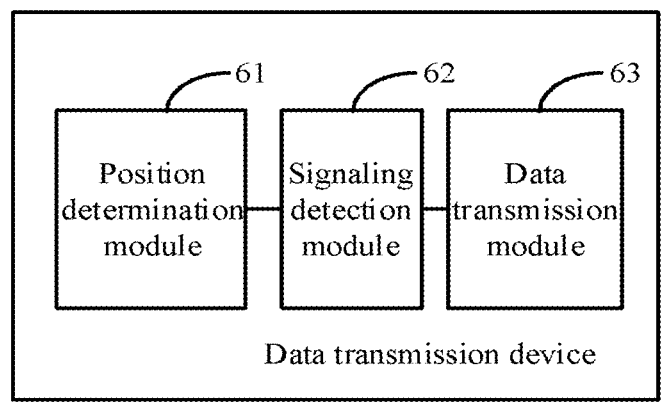
FIG. 6 is a block diagram of a data transmission device according to an exemplary embodiment.

Corresponding to the embodiments of the data transmission method, the present disclosure also provides embodiments of a data transmission device. FIG. 6 is a block diagram of a data transmission device according to an exemplary embodiment. The device is applied to a terminal and configured to execute the data transmission method shown in FIG. 1.

As shown in FIG. 6, the data transmission device may include a position determination module 61 that is configured to determine a non-fixed position for signaling detection on an unlicensed frequency band, a signaling detection module 62 that is configured to perform control signaling detection at the non-fixed position, and a data transmission module 63 that is configured to, in condition that control signaling is detected, perform corresponding data transmission according to an indication of the control signaling.

It can be seen from the embodiment that the non-fixed position for signaling detection on the unlicensed frequency band is determined, control signaling detection is performed at the non-fixed position for signaling detection, and responsive to that the control signaling is detected, corresponding data transmission is performed according to the indication of the control signaling. Therefore, control signaling detection on the unlicensed frequency band is implemented, the control signaling is accurately detected, and the success rate of corresponding data transmission is also ensured.

Figure 7:
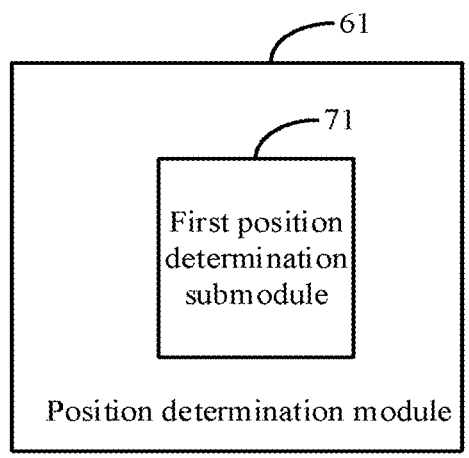
FIG. 7 is a block diagram of another data transmission device according to an exemplary embodiment.

In an embodiment, based on the device shown in FIG. 6, as shown in FIG. 7, the position determination module 61 may include a first position determination submodule 71 that is configured to determine the non-fixed position based on an obtained data transmission starting position.

Figure 8:
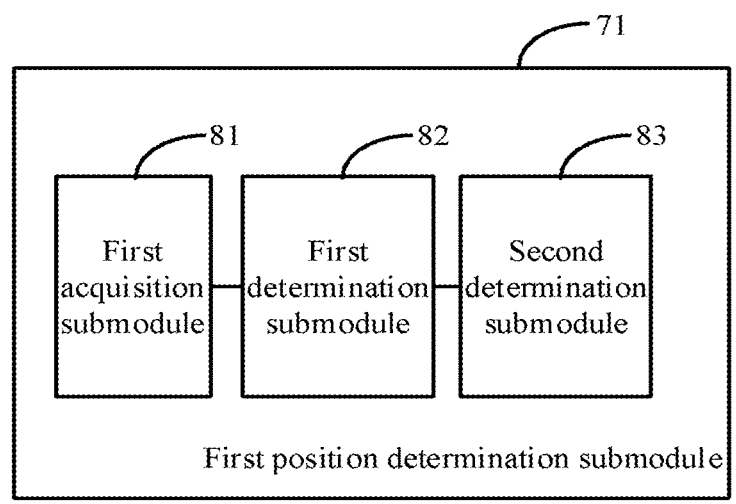
FIG. 8 is a block diagram of another data transmission device according to an exemplary embodiment.

In an embodiment, based on the device shown in FIG. 7, as shown in FIG. 8, the first position determination submodule 71 may include a first acquisition submodule 81 that is configured to acquire configuration information used for determining the data transmission starting position, a first determination submodule 82 that is configured to determine at least one data transmission starting position according to the configuration information, and a second determination submodule 83 that is configured to determine a non-fixed position corresponding to each data transmission starting position according to a first set rule.

In an embodiment, based on the device shown in FIG. 8, the configuration information is specified in a communication protocol or notified to the terminal by a base station through specified signaling.

Figure 9:
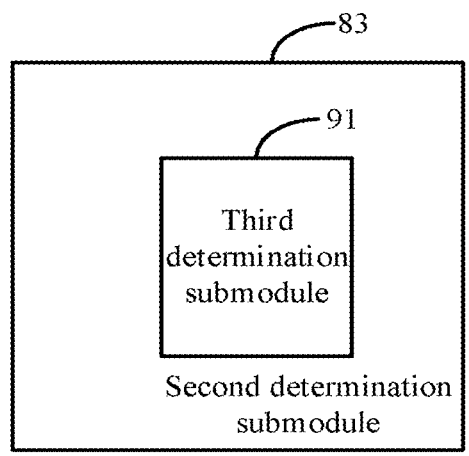
FIG. 9 is a block diagram of another data transmission device according to an exemplary embodiment.

In a further embodiment, based on the device shown in FIG. 8, the first set rule includes a first correspondence between a specified data transmission starting position and at least one specified detection position. As shown in FIG. 9, the second determination submodule 83 may include a third determination submodule 91 that is configured to, for any data transmission starting position, determine each specified detection position corresponding to the data transmission starting position according to the first correspondence and determine each specified detection position corresponding to the data transmission starting position as a non-fixed position.

Figure 10:
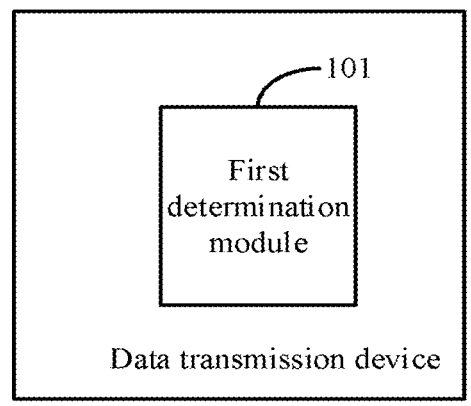
FIG. 10 is a block diagram of another data transmission device according to an exemplary embodiment.

In an embodiment, based on the device shown in FIG. 9, the first set rule also includes a second correspondence between a specified data transmission starting position and a specified detection manner, or the second correspondence is in another set rule different from the first set rule. As shown in FIG. 10, the device may further include a first determination module 101 that is configured to, for any data transmission starting position, determine a specified detection manner corresponding to the data transmission starting position according to the second correspondence.

Correspondingly, the signaling detection module 62 may include a first signaling detection submodule that is configured to, for any data transmission starting position, perform control signaling detection at the specified detection position corresponding to the data transmission starting position in the specified detection manner corresponding to the data transmission starting position.

In an embodiment, based on the device shown in FIG. 10, the first set rule is specified in a communication protocol or notified to the terminal by the base station through the specified signaling, and another set rule is also specified in the communication protocol or notified to the terminal by the base station through the specified signaling.

It can be seen from the embodiment that control signaling detection may be performed at the non-fixed position corresponding to each data transmission starting position, thereby enriching determination manners for the non-fixed position and further improving flexibility of the control signaling detection.

Figure 11:
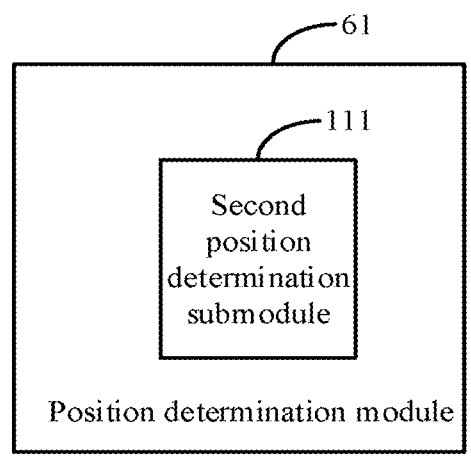
FIG. 11 is a block diagram of another data transmission device according to an exemplary embodiment.

In an embodiment, based on the device shown in FIG. 6, as shown in FIG. 11, the position determination module 61 may include a second position determination submodule 111 that is configured to determine the non-fixed position based on a detected known signal.

Figure 12:
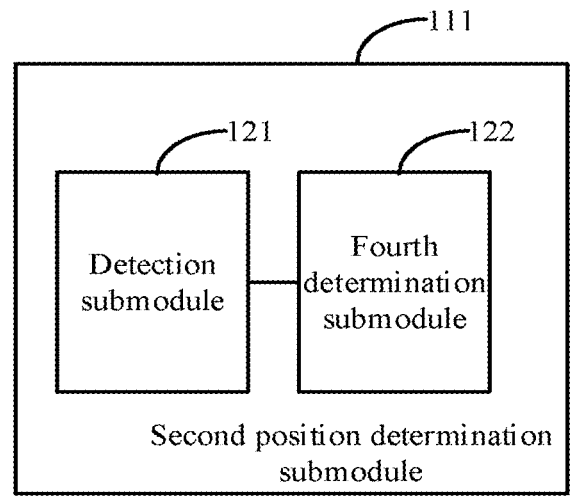
FIG. 12 is a block diagram of another data transmission device according to an exemplary embodiment.

In other embodiments, based on the device shown in FIG. 11, as shown in FIG. 12, the second position determination submodule 111 may include a detection submodule 121 that is configured to continuously detect the known signal sent by the base station, and a fourth determination submodule 122 that is configured to, responsive to that the known signal is detected, determine a non-fixed position corresponding to the known signal according to a second set rule.

Figure 13:
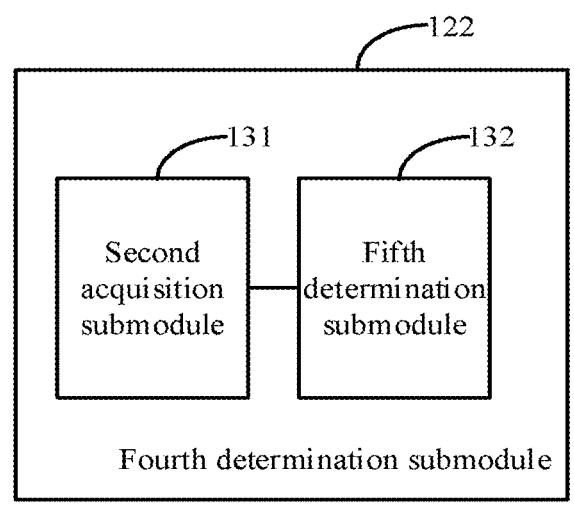
FIG. 13 is a block diagram of another data transmission device according to an exemplary embodiment.

In an embodiment, based on the device shown in FIG. 12, the second set rule includes a third correspondence between a specified signal sequence and at least one specified detection position. As shown in FIG. 13, the fourth determination submodule 122 may include a second acquisition submodule 131, configured to acquire a signal sequence of the known signal, and a fifth determination submodule 132 that is configured to determine each specified detection position corresponding to the signal sequence of the known signal according to the first correspondence and determine each specified detection position corresponding to the signal sequence of the known signal as a non-fixed position.

Figure 14:
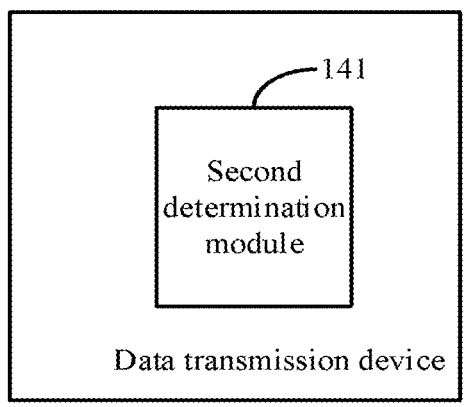
FIG. 14 is a block diagram of another data transmission device according to an exemplary embodiment.

In an embodiment, based on the device shown in FIG. 13, the second set rule also includes a fourth correspondence between a specified signal sequence and a specified detection manner, or the fourth correspondence is in another set rule different from the second set rule. As shown in FIG. 14, the device may further include a second determination module 141 that is configured to determine a specified detection manner corresponding to the signal sequence of the known signal according to the fourth correspondence.

Correspondingly, the signaling detection module 62 may include a second signaling detection submodule that is configured to perform control signaling detection at each specified detection position corresponding to the signal sequence of the known signal in the specified detection manner corresponding to the signal sequence of the known signal.

In an embodiment, based on the device shown in FIG. 14, the second set rule is specified in a communication protocol or notified to the terminal by the base station through the specified signaling, and another set rule is also specified in the communication protocol or notified to the terminal by the base station through the specified signaling.

It can be seen from the embodiment that, responsive to that the known signal is detected, control signaling detection may be performed at the non-fixed position corresponding to the known signal, thereby improving reliability of the control signaling detection and further improving accuracy of the data transmission.

Figure 15:
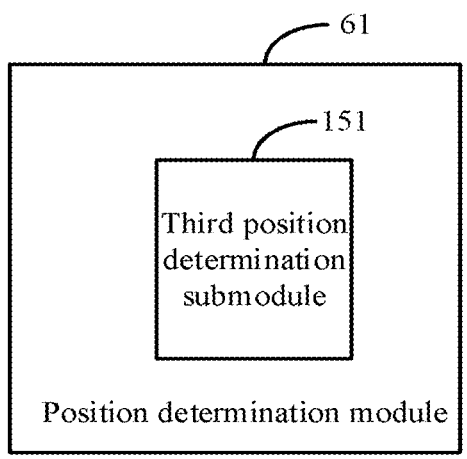
FIG. 15 is a block diagram of another data transmission device according to an exemplary embodiment.

In an embodiment, based on the device shown in FIG. 6, as shown in FIG. 15, the position determination module 61 may include a third position determination submodule 151, configured to determine the non-fixed position based on triggering signaling sent by the base station.

Figure 16:
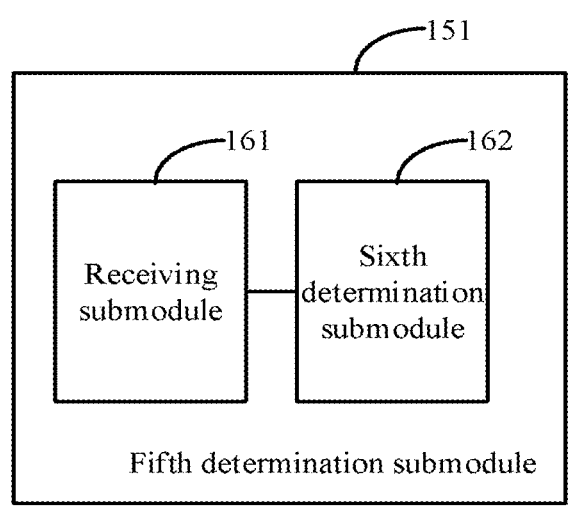
FIG. 16 is a block diagram of another data transmission device according to an exemplary embodiment.

In an embodiment, based on the device shown in FIG. 15, as shown in FIG. 16, the third position determination submodule 151 may include a receiving submodule 161 that is configured to receive the triggering signaling sent by the base station and configured to trigger signaling detection, and a sixth determination submodule 162 that is configured to determine a non-fixed position corresponding to the triggering signaling according to a third set rule.

Figure 17:
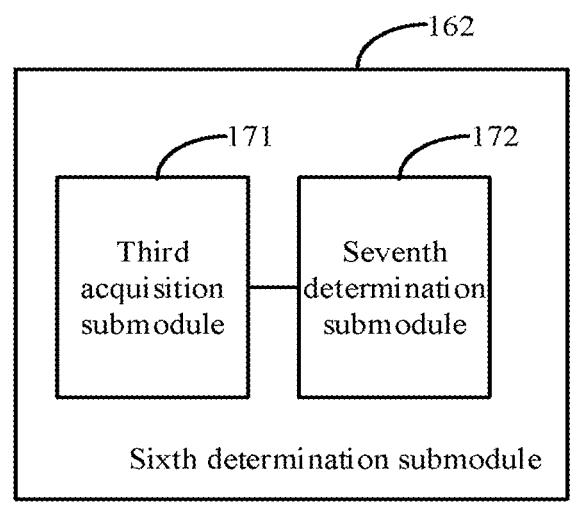
FIG. 17 is a block diagram of another data transmission device according to an exemplary embodiment.

In an embodiment, based on the device shown in FIG. 16, the triggering signaling is a wakeup signal sent by the base station, and the third set rule includes a fifth correspondence between a specified signal sequence and at least one specified detection position. As shown in FIG. 17, the sixth determination submodule 162 may include a third acquisition submodule 171 that is configured to acquire a signal sequence of the wakeup signal, and a seventh determination submodule 172 that is configured to determine each specified detection position corresponding to the signal sequence of the wakeup signal according to the fifth correspondence and determine each specified detection position corresponding to the signal sequence of the wakeup signal as a non-fixed position.

Figure 18:
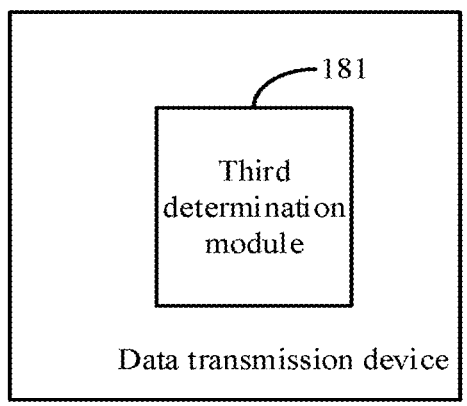
FIG. 18 is a block diagram of another data transmission device according to an exemplary embodiment.

In an embodiment, based on the device shown in FIG. 17, the third set rule also includes a sixth correspondence between a specified signal sequence and a specified detection manner, or the sixth correspondence is in another set rule different from the third set rule. As shown in FIG. 18, the device may further include a third determination module 181 that is configured to determine a specified detection manner corresponding to the signal sequence of the wakeup signal according to the sixth correspondence.

Correspondingly, the signaling detection module 62 may include a third signaling detection submodule that is configured to perform control signaling detection at each specified detection position corresponding to the signal sequence of the wakeup signal in the specified detection manner corresponding to the signal sequence of the wakeup signal.

In an embodiment, based on the device shown in FIG. 18, the third set rule is specified in a communication protocol or notified to the terminal by the base station through the specified signaling, and another set rule is also specified in the communication protocol or notified to the terminal by the base station through the specified signaling.

In an embodiment, the specified signaling includes at least one of: RRC signaling; MAC-CE signaling; or physical-layer signaling.

As can be seen from the embodiment, when the triggering signaling sent by the base station and configured to trigger signaling detection is received, control signaling detection may be performed at the non-fixed position corresponding to the triggering signaling, so that control signaling detection is completed under triggering of the base station, and reliability of the data transmission is improved.

The device embodiments substantially correspond to the method embodiments, and thus related parts refer to part of descriptions of the method embodiments. The device embodiment described above is only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the present disclosure. Those of ordinary skill in the art may understand and implement without creative work.

The present disclosure also provides a non-transitory computer-readable storage medium, in which a computer program is stored. The computer program is configured to execute the data transmission method as shown in any one of FIG. 1 to FIG. 5.

The present disclosure also provides a data transmission device, which is applied to a terminal. The device can include a processor and a memory configured to store an instruction executable by the processor. The processor is configured to determine a detection position for signaling detection on an unlicensed frequency band, perform control signaling detection at the detection position, and, in condition that control signaling is detected, perform corresponding data transmission according to an indication of the control signaling.

Figure 19:
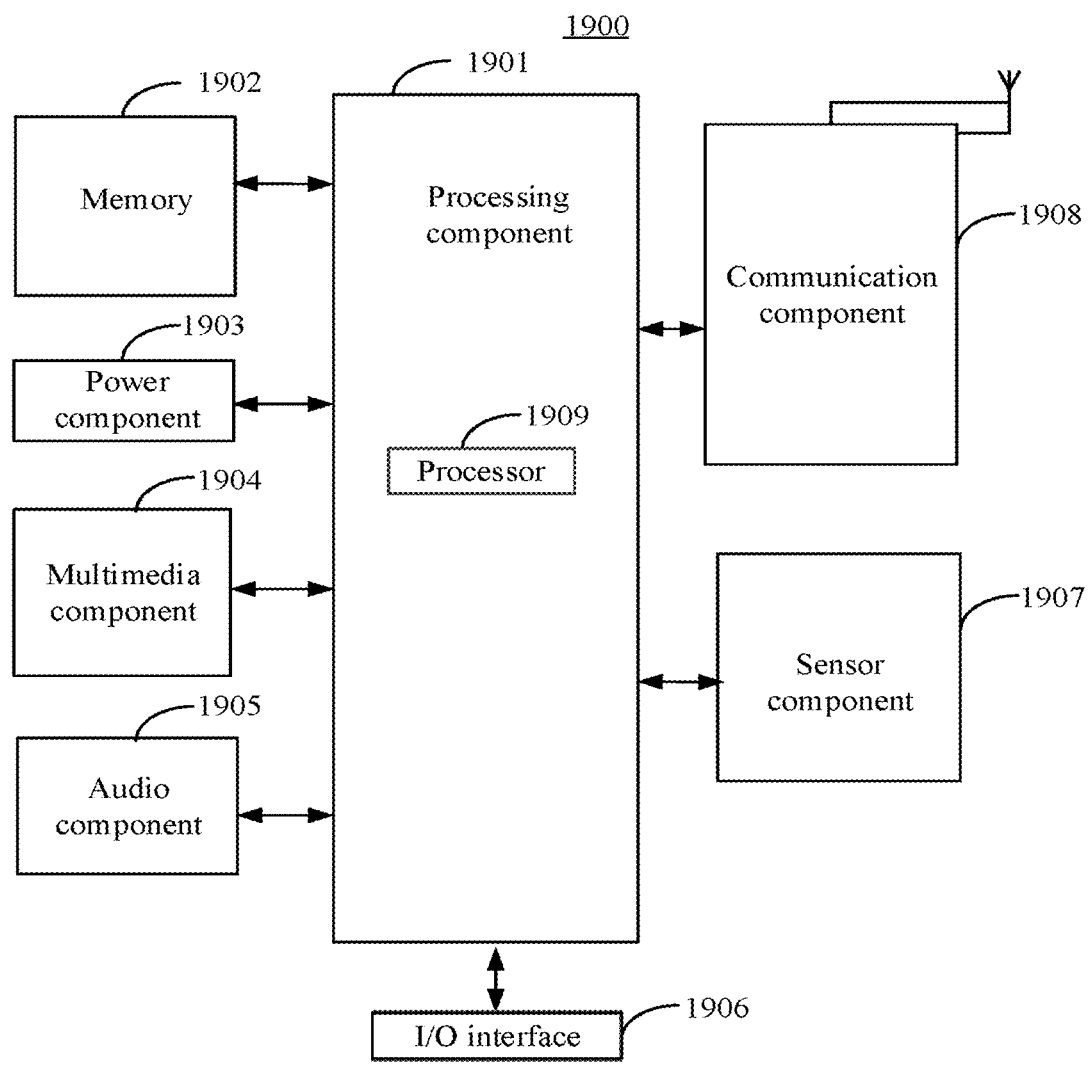
FIG. 19 is a structure diagram of a data transmission device according to an exemplary embodiment.

FIG. 19 is a structure diagram of a data transmission device according to an exemplary embodiment. FIG. 19 illustrates a data transmission device 1900 according to an exemplary embodiment. The device 1900 may be a terminal such as a computer, a mobile phone, a digital broadcast terminal, a messaging device, a gaming console, a tablet, a medical device, exercise equipment and a personal digital assistant.

Referring to FIG. 19, the device 1900 may include one or more of the following components: a processing component 1901, a memory 1902, a power component 1903, a multimedia component 1904, an audio component 1905, an Input/Output (I/O) interface 1906, a sensor component 1907 and a communication component 1908.

The processing component 1901 typically controls overall operations of the device 1900, such as the operations associated with display, telephone calls, data communications, camera operations, and recording operations. The processing component 1901 may include one or more processors 1909 to execute instructions to perform all or part of the steps in the abovementioned method. Moreover, the processing component 1901 may include one or more modules which facilitate interaction between the processing component 1901 and the other components. For instance, the processing component 1901 may include a multimedia module to facilitate interaction between the multimedia component 1904 and the processing component 1901.

The memory 1902 is configured to store various types of data to support the operation of the device 1900. Examples of such data include instructions for any applications or methods operated on the device 1900, contact data, phonebook data, messages, pictures, video, and the like. The memory 1902 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1903 provides power for various components of the device 1900. The power component 1903 may include a power management system, one or more power supplies, and other components associated with generation, management and distribution of power for the device 1900.

The multimedia component 1904 includes a screen providing an output interface between the device 1900 and a user. In some embodiments, the screen may include a Liquid Crystal Display (LCD) and a Touch Panel (TP). If the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action but also detect a duration and pressure associated with the touch or swipe action. In some embodiments, the multimedia component 1904 includes a front camera and/or a rear camera. The front camera and/or the rear camera may receive external multimedia data when the device 1900 is in an operation mode, such as a photographing mode or a video mode. Each of the front camera and the rear camera may be a fixed optical lens system or have focusing and optical zooming capabilities.

The audio component 1905 is configured to output and/or input an audio signal. For example, the audio component 1905 includes a Microphone (MIC), and the MIC is configured to receive an external audio signal when the device 1900 is in the operation mode, such as a call mode, a recording mode and a voice recognition mode. The received audio signal may further be stored in the memory 1902 or sent through the communication component 1908. In some embodiments, the audio component 1905 further includes a speaker configured to output the audio signal.

The I/O interface 1906 provides an interface between the processing component 1901 and a peripheral interface module, and the peripheral interface module may be a keyboard, a click wheel, a button and the like. The button may include, but not limited to: a home button, a volume button, a starting button, and a locking button.

The sensor component 1907 includes one or more sensors configured to provide status assessment in various aspects for the device 1900. For instance, the sensor component 1907 may detect an on/off status of the device 1900 and relative positioning of components, such as a display and small keyboard of the device 1900, and the sensor component 1907 may further detect a change in a position of the device 1900 or a component of the device 1900, presence or absence of contact between the user and the device 1900, orientation or acceleration/deceleration of the device 1900 and a change in temperature of the device 1900. The sensor component 1907 may include a proximity sensor, configured to detect presence of an object nearby without any physical contact. The sensor component 1907 may also include a light sensor, such as a Complementary Metal Oxide Semiconductor (CMOS) or Charge Coupled Device (CCD) image sensor, configured for use in an imaging application. In some embodiments, the sensor component 1907 may also include an acceleration sensor, a gyroscope sensor, a magnetic sensor, a pressure sensor or a temperature sensor.

The communication component 1908 is configured to facilitate wired or wireless communication between the device 1900 and another device. The device 1900 may access any communication-standard-based wireless network, such as a Wi-Fi network, a 2nd-Generation (2G) or 3rd-Generation (3G) network or a combination thereof. In an exemplary embodiment, the communication component 1908 receives a broadcast signal or broadcast associated information from an external broadcast management system through a broadcast channel. In an exemplary embodiment, the communication component 1908 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 1900 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1902 including an instruction, and the instruction may be executed by the processor 1909 of the device 1900 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device, and the like.

The instruction in the storage medium is executed by the processor to enable the device 1900 to execute any data transmission method.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A data transmission method on an unlicensed frequency band that is applied to a terminal, the method comprising:
    determining a non-fixed position for signaling detection on the unlicensed frequency band, wherein the determining comprises:
        acquiring configuration information that is used for determining a data transmission starting position;
        determining at least one data transmission starting position based on the configuration information; and
        determining a non-fixed position corresponding to each data transmission starting position based on a first set rule;
    performing control signaling detection at the non-fixed position; and
    performing data transmission corresponding to the control signaling based on an indication of the control signaling when the control signaling is detected.

2. The method of claim 1, wherein the configuration information is specified in a communication protocol or notified to the terminal by a base station through specified signaling.

3. The method of claim 2, wherein the specified signaling further comprises at least one of:
    Radio Resource Control (RRC) signaling;
    Media Access Control-Control Element (MAC-CE) signaling; or
    physical-layer signaling.

4. The method of claim 1, wherein:
    the first set rule comprises a first correspondence between a specified data transmission starting position and at least one specified detection position, and
    determining a detection position corresponding to each data transmission starting position and configured for signaling detection according to the first set rule comprises,
    for any data transmission starting position, determining each specified detection position corresponding to the data transmission starting position based on the first correspondence, and determining each specified detection position corresponding to the data transmission starting position as a non-fixed position.

5. The method of claim 4, wherein:
    the first set rule is specified in a communication protocol or notified to the terminal by a base station through specified signaling, and the first set rule also comprises a second correspondence between a specified data transmission starting position and a specified detection manner, and
    the method further comprises:
        for any data transmission starting position, determining a specified detection manner corresponding to the data transmission starting position based on the second correspondence; and
        performing control signaling detection at the detection position comprises,
        for any data transmission starting position, performing control signaling detection at the specified detection position corresponding to the data transmission starting position in the specified detection manner corresponding to the data transmission starting position.

6. A data transmission method on an unlicensed frequency band that is applied to a terminal, the method comprising:
    determining a non-fixed position for signaling detection on the unlicensed frequency band, wherein the determining comprises:
        continuously detecting a known signal sent by a base station; and
        determining a non-fixed position corresponding to the known signal according to a second set rule when the known signal is detected;
    performing control signaling detection at the non-fixed position; and
    performing data transmission corresponding to the control signaling based on an indication of the control signaling when the control signaling is detected.

7. The method of claim 6, wherein:
    the second set rule comprises a third correspondence between a specified signal sequence and at least one specified detection position, and determining the non-fixed position corresponding to the known signal according to the second set rule further comprises:
acquiring a signal sequence of the known signal; and
determining each specified detection position corresponding to the signal sequence of the known signal based on the third correspondence, and determining each specified detection position corresponding to the signal sequence of the known signal as a non-fixed position.

8. The method of claim 7, wherein:
the second set rule is specified in a communication protocol or notified to the terminal by the base station through specified signaling, and the second set rule also comprises a fourth correspondence between a specified signal sequence and a specified detection manner, and
the method further comprises
determining a specified detection manner corresponding to the signal sequence of the known signal according to the fourth correspondence, and
performing control signaling detection at the detection position further comprises:
performing control signaling detection at each specified detection position corresponding to the signal sequence of the known signal in the specified detection manner corresponding to the signal sequence of the known signal.

9. A data transmission method on an unlicensed frequency band that is applied to a terminal, the method comprising:
determining a non-fixed position for signaling detection on the unlicensed frequency band, wherein the determining comprises:
receiving a triggering signaling sent by a base station and configured to trigger signaling detection; and
deter lining a non-fixed position corresponding to the triggering signaling based on a third set rule;
performing control signaling detection at the non-fixed position; and
performing data transmission corresponding to the control signaling based on an indication of the control signaling when the control signaling is detected.

10. The method of claim 9, wherein:
the triggering signaling is a wakeup signal sent by the base station, and the third set rule comprises a fifth correspondence between a specified signal sequence and at least one specified detection position, and
determining the non-fixed position corresponding to the triggering signaling based on the third set rule further comprises:
acquiring a signal sequence of the wakeup signal; and
determining each specified detection position corresponding to the signal sequence of the wakeup signal based on the fifth correspondence, and determining each specified detection position corresponding to the signal sequence of the wakeup signal as a non-fixed position.

11. The method of claim 10, wherein:
the third set rule is specified in a communication protocol or notified to the terminal by the base station through specified signaling, and the third set rule further comprises a sixth correspondence between a specified signal sequence and a specified detection manner, and
the method further comprises:
determining a specified detection manner corresponding to the signal sequence of the wakeup signal according to the sixth correspondence; and
performing control signaling detection at the detection position further comprises
performing control signaling detection at each specified detection position corresponding to the signal sequence of the wakeup signal in the specified detection manner corresponding to the signal sequence of the wakeup signal.

12. A data transmission device implementing the method of claim 1, the data transmission device being applied to a terminal and comprising:
a processor; and
a memory that is configured to store an instruction executable by the processor,
wherein the processor is configured to:
determine a non-fixed position for signaling detection on an unlicensed frequency band;
perform control signaling detection at the non-fixed position; and
perform data transmission corresponding to the control signaling based on an indication of the control signaling when the control signaling is detected;
wherein the processor is further configured to:
acquire configuration information that is used for determining a data transmission starting position;
determine at least one data transmission starting position based on the configuration information; and
determine a non-fixed position corresponding to each data transmission starting position based on a first set rule.

* * * * *